United States Patent [19]

Sakoe

[11] 3,979,722

[45] Sept. 7, 1976

[54] AUTOMATIC CHARACTER RECOGNITION DEVICE EMPLOYING DYNAMIC PROGRAMMING

[75] Inventor: Hiroaki Sakoe, Tokyo, Japan

[73] Assignee: Nippon Electric Company, Ltd., Tokyo, Japan

[22] Filed: May 30, 1975

[21] Appl. No.: 582,520

[30] Foreign Application Priority Data
May 31, 1974 Japan .............................. 49-62240
Sept. 9, 1974 Japan ............................ 49-104174

[52] U.S. Cl. ..................................... 340/146.3 AE
[51] Int. Cl.² ......................................... G06K 9/00
[58] Field of Search ............. 340/146.3 Q, 146.3 H, 340/146.3 AE

[56] References Cited
UNITED STATES PATENTS
3,766,520   10/1973   Patterson .................. 340/146.3 AE

*Primary Examiner*—Joseph M. Thesz
*Attorney, Agent, or Firm*—Sughrue, Rothwell, Mion, Zinn and Macpeak

[57] ABSTRACT

A character recognition device comprises a memory for memorizing standard patterns, each given by fundamental vectors. A dynamic matching unit finds out a maximum of degrees of coincidence between an input character and line patterns derived from each of the standard patterns by varying the magnitudes of the vectors between predetermined minima and maxima and derives similarity measures defined by the maximum degrees of coincidence between the input character and the line patterns derived from the respective standard patterns and specific line patterns for which the maximum degrees of coincidence are found. A decision unit compares the similarity measures with one another, judges whether or not the input character has a feature predetermined for each of the standard patterns, and delivers a result of the recognition in response to results of the comparison and judgment.

8 Claims, 17 Drawing Figures

AUTOMATIC CHARACTER RECOGNITION DEVICE EMPLOYING DYNAMIC PROGRAMMING

BACKGROUND OF THE INVENTION

This invention relates to a device for automatically recognizing two-dimensional input patterns which may be handwritten letters, numerals, and accompanying marks.

Character recognition devices have been much in demand as input devices for putting data and programs into electronic computers and those for automatically recognizing printed character patterns are already widely used. It is to be noted here that most of the data and programs for computers must be once written on paper by hand and that there accordingly is an eager demand for devices for automatically recognizing these handwritten character patterns. Handwritten character patterns, however, widely vary. No techniques have therefore been known for satisfactorily recognizing the handwritten character patterns. This has made it inevitable at present to impose a severe restriction upon the style of the handwritten character patterns in order to meet the requirements for automatic recognition thereof. Devices for recognizing handwritten character patterns with such a restriction are in practical use despite the fact that the restriction is inconvenient and undesirable for those who actually write the characters.

In general, a character recognition device comprises an input unit for converting the optical signals produced by two-dimensional input patterns into electric signals and a recognition unit for carrying out logic or arithmetic operation on the electric signals to decide the input patterns. Inasmuch as input units of excellent performance are already available, it is the recognition unit that poses a serious problem to be solved on designing a device for automatically recognizing handwritten character patterns. Among various principles on which the recognition units are operable, the pattern matching method is simple and most frequently resorted to. According to the pattern matching method described in detail by M. B. Clowes and J. R. Parks in *The Computer Journal*, Volume 4, No. 2 (1961) pp. 121–128, the input character patterns are subjected to comparion or pattern matching with standard or reference character patterns (hereafter called "standard patterns" for brevity) preliminarily prepared for all sorts of the character patterns to be recognized and are decided to be those of the standard patterns which are in best coincidence or agreement with the respective input character patterns. Although effective for recognition of input character patterns of a predetermined type, such as printed ones of several predetermined fonts or those handwritten under a severe restriction, this method is liable to mis-recognition in the case of character patterns handwritten without much care because even a slight departure or deviation from the standard patterns renders the agreement therewith unstable. In the nearest neighbor method described in *IEEE Transactions on Information Theory*, Volume IT-13, No. 1 (January, 1967), pp. 21–27, the above-mentioned pattern matching method is adapted to recognition of character patterns liable to deviation to a certain degree. In accordance with the nearest neighbor method, a plurality of standard patterns of different styles are prepared instead of only one used in the pattern matching method for each sort of the character patterns to be recognized. It is, however, necessary for a device according to the nearest neighbor scheme to memorize a great number of standard patterns and to carry out the comparison a corresponding number of times. The device therefore becomes complicated and expensive if designed for automatic recognition of character patterns manually freely written.

SUMMARY OF THE INVENTION

It is therefore an object of the present invention to provide an automatic character recognition device applicable to recognition of character patterns manually freely written.

It is another object of this invention or provide an automatic character recognition device which will not mis-recognize character patterns supplied thereto.

It is still another object of this invention to provide an automatic character recognition device which is less expensive and complicated than those based on the nearest neighbor principles.

A device according to this invention is for automatically recognizing an input pattern of one of a predetermined number of sorts by comparing the input pattern successively with standard patterns of at least the predetermined number of sorts. The input pattern is specifiable by a two-dimensional array of meshes of different optical characteristics. Each of the standard patterns is given by a series of fundamental vectors. The device comprises an input pattern buffer memory for memorizing input electric signals representative of the optical characteristics and a standard pattern memory for memorizing standard electric signals representative of the directions and predetermined minima and maxima of magnitudes of vectors of the standard patterns. The device further comprises a dynamic matching unit responsive to the input and standard electric signals for finding a maximum of degrees of coincidence between the input pattern and a plurality of line patterns derived from each of the standard patterns by varying the magnitudes between the predetermined minima and maxima to produce first electric signals representative of similarity measures defined by the maximum degrees of coincidence between the input pattern and the line patterns derived from the respective standard patterns and second electric signals representative of specific line patterns for which the maximum degrees of coincidence are found. The device still further comprises a decision unit comprising, in turn, first means for memorizing feature electric signals representative of a predetermined feature common to the line patterns derivable from each of the standard patterns, second means for comparing the first electric signals with one another, third means responsive to the input, second, and feature electric signals for judging whether or not the input pattern has the predetermined feature, and fourth means responsive to results of the comparison and judgment carried out by the second and third means for producing an output electric signal representative of a result of recognition of the input pattern.

For brevity, the expression "electric signals representative of an input pattern" and the like will be referred to in the following merely as "an input pattern" and others where intelligible.

BRIEF DESCRIPTION OF THE DRAWING

Each of FIGS. 12, 13, 14 and 15 illustrates an input pattern and a specific line pattern.

DESCRIPTION OF THE PREFERRED EMBODIMENTS

Figures 1, 2, 3, 4:
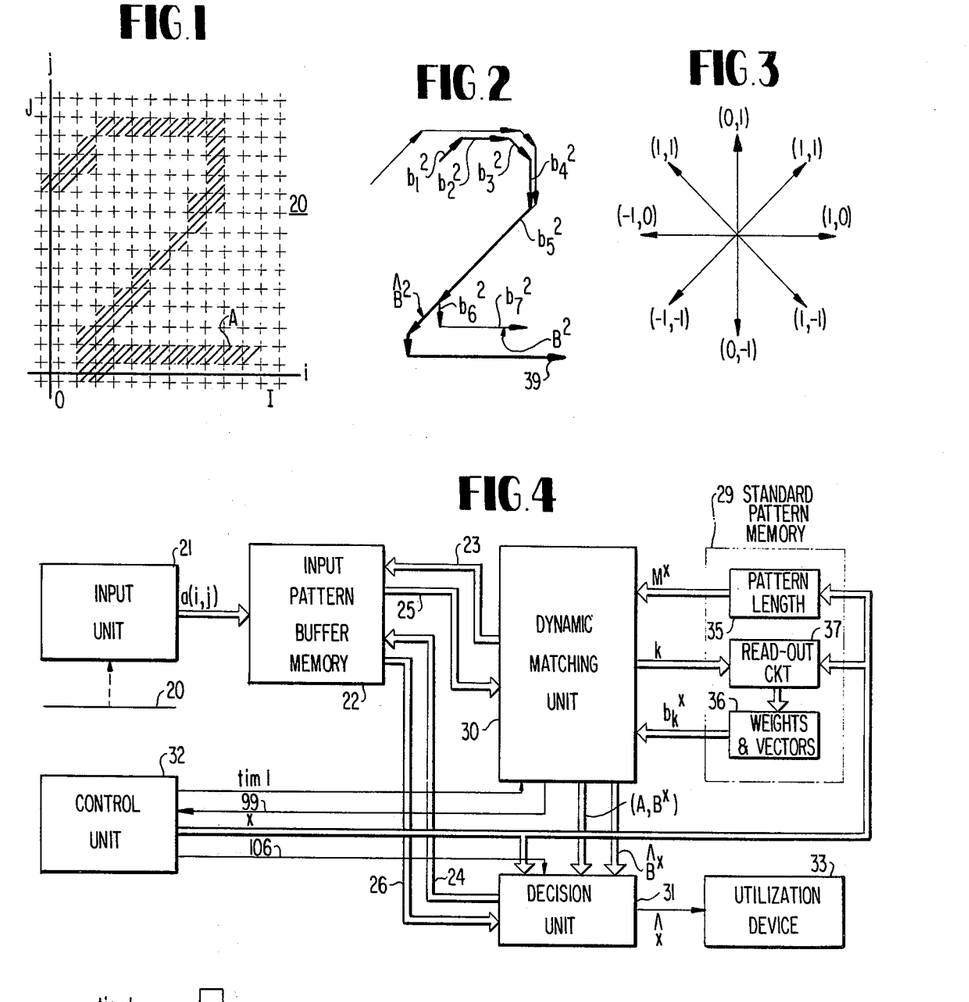
FIG. 1 illustrates a two-dimensional pattern to be supplied as an input pattern to an automatic pattern or character recognition device according to the instant invention.
FIG. 2 shows an example of standard or reference patterns for putting a device according to this invention into operation, together with a specific line pattern for the input pattern depicted in FIG. 1.
FIG. 3 shows quantized directions of vectors of which the standard patterns are composed.
FIG. 4 is a block diagram of a device according to an embodiment of this invention.

Referring to FIG. 1, a numeral 2 manually freely written on a sheet of paper 20 is shown as an example of an "input pattern" A to be recognized by an automatic pattern or character recognition device according to the present invention. The input pattern A may be defined by a two-dimensional array of meshes that are designated by coordinates $i$ and $j$ and have different optical characteristics, such as light and shade, specifiable by multilevel electric signals. The coordinates $i$ and $j$ may vary from 0 to maximum coordinates I and J, respectively, For simplicity, it is assumed here that the input pattern A is dark while the paper 20 is white, that the dark and white meshes are represented by binary electric signals 1 and −1, respectively, and that each of the maximum coordinates I and J does not exceed 15. Each coordinate may thus be designated by a set of four bit-parallel binary signals.

Referring to FIGS. 2 and 3, each of "standard patterns" $B^x$ for use in putting a device according to this invention into operation is defined by a series of fundamental vectors $b_k^x$. The letter $x$ represents sorts of the standard patterns while the suffix $k$ represents ordinal numbers of the vectors in each series, starting at unity and ending at the relevent one of the total of numbers $M^x$ of vectors in the respective standard patterns $B^x$. The total numbers $M^x$ may be 32 at most. For recognition of handwritten alphanumeric letters and marks, the number of sorts $x$ may be 64 when only one standard pattern is used for each sort of the input patterns to be recognized by the device although a few standard patterns may be provided for each. For convenience of further description, it is now presumed that directions (with senses) $d_k^x$ of the fundamental vector $b_k^x$ are specified by eight quantized directions, each of which is given by a set of direction signals $u_k^x$ and $v_k^x$ illustrated in FIG. 3, and that each of magnitudes or lengths $e_k^x$ thereof is quantized by the number of meshes. On the other hand, it is possible to derive various "line patterns" $B^{x\prime}$ (not shown) from the standard patterns $B^x$ by varying the magnitudes $e_k^x$ and to find out in a manner to be later described the pertinent one of the line patterns B′ that is derived from each standard pattern B and may be said to be most similar, if not in best approximation, to the input pattern A. Such pertinent ones of the line patterns $B^{x\prime}$ are called herein "specific line patterns" $\hat{B}^x$. What should be noted here is that the lengths $e_k^x$ are varied between lower limits or minima $m_k^x$ and upper limits or maxima $n_k^x$ predetermined for the respective fundamental vectors $b_k^x$. This is mandatory in order not to derive from a standard pattern a line pattern that belongs to the sort of another standard pattern. For instance, a line pattern derived from a standard pattern $B^2$ exemplified in FIG. 2 would be similar to 7 rather than to 2 if the length of the bottom vector $b_7^2$ were reduced to zero. In addition, it is desirable to assign weights $w_k^x$ representative of the importance of the respective fundamental vectors $b_k^x$ on comparing the line pattern vectors derived therefrom with perminent portions of the input pattern A. It is thus possible to give the standard patterns $B^x$ by standard pattern electric signals $b_k^x$ ($w_k^x$, $d_k^x$, $m_k^x$, $n_k^x$), each of which is a word of 13 bit-parallel binary signals the 13 bits consisting of three weight bits $w_k^x$, three direction bits $d_k^x$, three minimum length bits $m_k^x$ and four maximum length bits $n_k^x$. A standard pattern B is given by 32 words. It is also possible to designate the ordinal numbers $k$ by a set of five bit-parallel binary signals and the sorts $x$ by a set of six bit-parallel binary signals.

Figure 5:
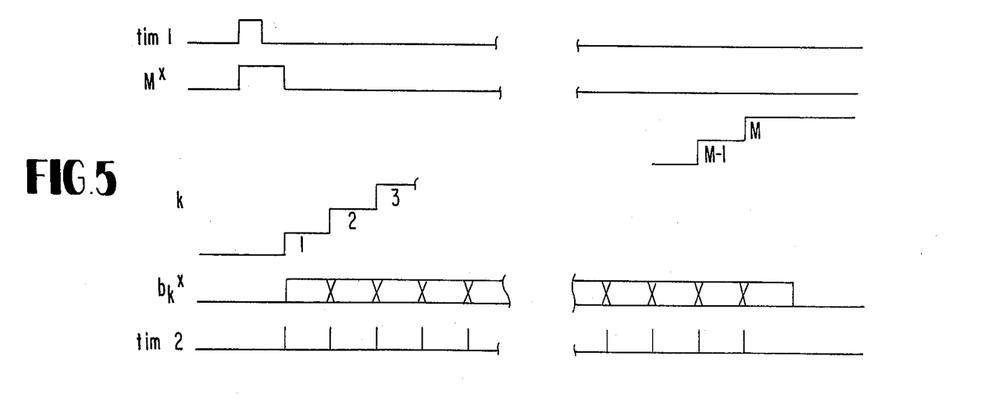
FIG. 5 shows several signals appearing in the embodiment illustrated in FIG. 4 and a series of pulses which will be described with reference to FIG. 7.

Referring now to FIGS. 4 and 5, a device according to an embodiment of the instant invention comprises an input unit 21 for opto-electrically converting an input pattern A into input pattern electric signals a $(i,j)$ representative of the optical characteristics of meshes $(i,j)$ and an input pattern buffer memory 22 for temporarily memorizing the input signals a $(i,j)$ at memory locations (not shown) specifiable by coordinate address signals 23 or 24 (described later) to produce input signals 25 or 26 (described later). The input unit 21 may be a known photo-diode array or a flying-spot scanner described in *The Computer Journal*, Volume 4, No. 2 (1961), pp. 137–143, with reference to FIG. 1 thereof and consequently will not be further described herein. Preferably the buffer memory 22 is a random access memory. The device further comprises a standard pattern memory 29 for memorizing the standard patterns $B^x$, a dynamic matching unit 30 (later described with reference to FIGS. 7 and others), a decision unit 31 (later described with reference to FIGS. 16 and others), and a control unit 32 for producing several signals for controlling the operation of the standard pattern memory 29, dynamic matching unit 30, and decision unit 31 in the manner described hereunder. The decision unit 31 supplies an ultimate sort signal $\hat{x}$ representative of a result of the pattern recognition to a utilization device 33. Simultaneously with the respective leading edges of first timing pulses tim1, the control unit 32 successively supplies standard pattern sort signals $x$ to the standard pattern memory 29 and decision unit 31. The standard pattern memory 29 comprises a pattern length memory 35 which supplies the dynamic matching unit 30 with total number signals $M^x$ representative of the total numbers of vectors contained in the respective standard patterns $B^x$ successively specified by the sort signals $x$. The dynamic matching unit 30 now successively supplies the standard pattern memory 29 with vector number signals $k$ that increases for the present from unity to a relevant one of the total numbers $M^x$ during presence of each of the sort signals $x$. A random access memory 36 stores the standard pattern signals $b_k^x$ and is accompanied by a read-out circuit 37 which is supplied with the sort signals $x$ and the vector number signals $k$ to make the random access memory 35 successively deliver the standard pattern signals $b_k^x$ to the dynamic matching unit 30 immediately following each of the total number signals $M^x$.

It is now surmised that a $k$-th line pattern vector $b_k$ (for simplicity, symbols $b_k$ and others is and will be again used) of one of the line patterns $B'$ derived from a specified one of the standard pattern B has its vector end at a point $(i_k, j_k)$, a length $e_k$, and a direction $(u_k, v_k)$. The $k$-th line pattern vector $b_k$ passes through meshes of the coordinates:

$$(i_k, j_k), (i_k - u_k, j_k - v_k), (i_k - 2u_k, j_k - 2v_k), \ldots, \text{and } (i_k - (e_k-1)u_k, j_k - (e_k-1)v_k) \quad (1)$$

which may readily be calculated when the coordinates $i_k$ and $j_k$ are given. A degree of partial coincidence $H_k$ between the above-mentioned one line pattern $B'$ and the input pattern A may be defined by:

$$H_k(i_k, j_k, e_k) = w_k \sum_{p=1}^{e_k} a(i_k - (p-1)u_k, j_k - (p-1)v_k) \quad (2)$$

for the $k$-th line pattern vector $b_k$. A degree of coincidence F of the above-mentioned one line pattern $B'$ with the input pattern A may therefore be defined by:

$$F(i_M, j_M, e_k) = \sum_{k=1}^{M} H_k(i_k, j_k, e_k) \quad (3)$$

as a function of $i_k, j_k$, and $e_k$. It is to be noted here that each of the line pattern vector ends $(i_k, j_k)$ is uniquely determined by a vector end $(i_M, j_M)$ of the M-th line pattern vector $b_M$ and the line pattern vector lengths $e_k$ provided that the vector directions $d_k$ are kept unchanged. For instance, the end point of the sixth line pattern vector $b_6^2$ depicted in FIG. 2 is determined by a vector end 39 $(i_7^2, j_7^2)$ of the seventh line pattern vector $b_7^2$ and its length $e_7^2$. The end points of the fifth, fourth, ..., and first line pattern vectors $b_5^2, b_4^2, \ldots$, and $b_1^2$ are similarly determined. The independent variables for the degree F of coincidence are therefore $(i_M, j_M)$ and $e_k$ as written in Equation (3). A similarity measure $S(A,B)$ between the input pattern A and the specified standard pattern B is now defined by:

$$S(A, B) = \max_{e_k, (i_M, j_M)} F,$$

namely, the maximum of the degrees of coincidence F $(i_M, j_M, e_k)$ calculated for all possible end points $(i_M, j_M)$ of the M-th vectors $b_M$ of the respective line patterns $B'$ and for all combinations of the line pattern vector lengths $e_k$ varied between the respective minima $m_k$ and maxima $n_k$. A set of an end points $(\hat{i}_M, \hat{j}_M)$ of the M-th line pattern vector and lengths $\hat{e}_k$ of the line pattern vectors that gives the similarity measure S (A,B) defines a particular line pattern, which may be said to be most similar among the line patterns $B'$ to the input pattern A and is already named the specific line pattern $\hat{B}$.

The dynamic matching unit 30 illustrated in FIG. 4 derives in effect the line patterns $B'$ from each standard pattern B and finds out the similarity measures $S(A, B^x)$ and the specific line patterns $\hat{B}^x$ for the respective standard patterns $B^x$. For simplicity, this is done in practice in accordance with the dynamic programming which is described on pp. 3–29 of a book entitled *Applied Dynamic Programming* and published in 1962 by Princeton University Press and was applied to a similarity computer and a pattern recognition system disclosed and claimed in U.S. Pat. No. 3,816,722 by the present inventor as one of two joint inventors of the referenced patent.

More particularly, recurrence coefficients $g_k(i, j)$ as called in the referenced patent are now given as:

$$g_k(i, j) = \max_{m_k \leq e \leq n_k} [H_k(i, j, e) + g_{k-1}(i - eu_k, j - ev_k)]. \quad (4)$$

Calculation of Equation (4) is performed for all meshes $(i, j)$ in a domain $0 \leq i \leq I$ and $0 \leq j \leq J$, where the initial condition is given by:

$$g_0(i, j) = 0$$

for the domain mentioned above. When the recurrence coefficients $g_k(i, j)$ are successively calculated from a first stage where $k = 1$ up to an M-th stage where $k = M$, an ultimate recurrence coefficient $g_M(i, j)$ results which gives the maximum of the degrees of coincidence $F(i_M, j_M, e_k)$ for the line patterns $B'$ derived from the specified standard pattern B. The similarity measure S (A, B) for the input pattern A and the specified standard pattern B is therefore given by:

$$S(A, B) = \max_{(i, j)} [g_M(i, j)]. \quad (5)$$

Figure 6:
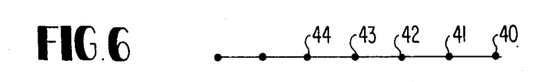
FIG. 6 shows several mesh points for describing operation of a dynamic matching unit shown in FIG. 1.

Referring to FIG. 6, let it be assumed by way of example that a $k$-th line pattern vector $b_k$ be directed for simplicity in the positive direction of the $i$-axis, that the minimum and maximum lengths $m_k$ and $n_k$ thereof be 3 and 6, respectively, and that a $k$-th stage coefficient $g_k$ $(i, j)$ be calculated at first for a mesh point 40 $(i, j)$. For $e_k = 3$, the degree of partial coincidence $H_k(i, j, 3)$ is a sum of the input signals $a(i, j)$ at meshes 40, 41 and multiplied by the common weight $w_k$. A $(k - 1)$-th stage coefficient $g_{k-1}(i, j)$ at a next neighboring mesh point 43 (the starting point of the line pattern vector $b_k$ of the minimum length 3) is $g_{k-1}(i-3, j)$. The sum of $H_k(i, j, 3)$ and $g_{k-1}(i-3, j)$ gives the value of the formula enclosed with the brackets in Equation (4). For $e_k = 4$, another value of the formula in question is calculated by the input signal $a(i, j)$ at the meshes 40, 41, 42, and 43 and another $(k - 1)$-th stage coefficient $g_{k-1}(i, j)$ at a mesh 44. Likewise, other values of the formula are calculated for $e_k = 5$ and 6. The maximum of these four values gives the $k$-th stage coefficient $g_k(i, j)$ for the mesh 40. Thus, calculation of Equation (4) is carried out for one mesh. When Equation (4) is calculated for all the meshes in a domain $0 \leq i \leq I$ and $0 \leq j \leq J$, calculation of a $k$-th stage is accomplished. At a time when Equation (4) is calculated from $k=1$ to $k=M$, $g_M(i, j)$ in Equation (4) for all the meshes in a domain $0 \leq i \leq I$ and $0 \leq j \leq J$ is obtained, and as a result, Equation (5) gives the similarity measure $S(A, B)$.

The specific line pattern $\hat{B}$ for the specified standard pattern B is also calculated in accordance with the dynamic programming. During calculation of the recurrence formula $g_k(i, j)$, line pattern vector lengths $\hat{e}(k, i, j)$ of the specific line pattern $\hat{B}$ for which the value of the formula enclosed with the brackets in Equation (4) reaches a maximum are memorized by their ordinal numbers $k$ and end points $(i, j)$. The vector lengths $\hat{e}(k, i, j)$ will be named "specific vector lengths." Upon completion of calculation of Equation (5) after the $M$-th stage calculation of Equation (4), the mesh $(i, j)$ gives the end point $(\hat{i}_M, \hat{j}_M)$ of the $M$-th vector of the specific line pattern $\hat{B}$. The end point $(\hat{i}_{M-1}, \hat{j}_{M-1})$ of the $(M-1)$-th specific line pattern vector is $(\hat{i}_M - \hat{e}_M u_M, \hat{j}_M - \hat{e}_M v_M)$. Likewise, the end points of the $(k-1)$-th specific line pattern vectors are given by:

$$(\hat{i}_{k-1}, \hat{j}_{k-1}) = (\hat{i}_k - \hat{e}_k u_k, \hat{j}_k - \hat{e}_k v_k) \qquad (6)$$

for $k = M$ down to $k = 2$. The starting point of the first specific line pattern vector is given by Equation (6) with the value of $k$ set at 1. The signals $\hat{B}^x$ labelled in FIG. 4 may be given by $(e_k, i_k j_k)$ for the $M$-th down to the first line pattern vectors of the specific line pattern $\hat{B}$. Incidentally, the meshes for the $k$-th specific line vectors may be given by Formula (1).

Figure 7:
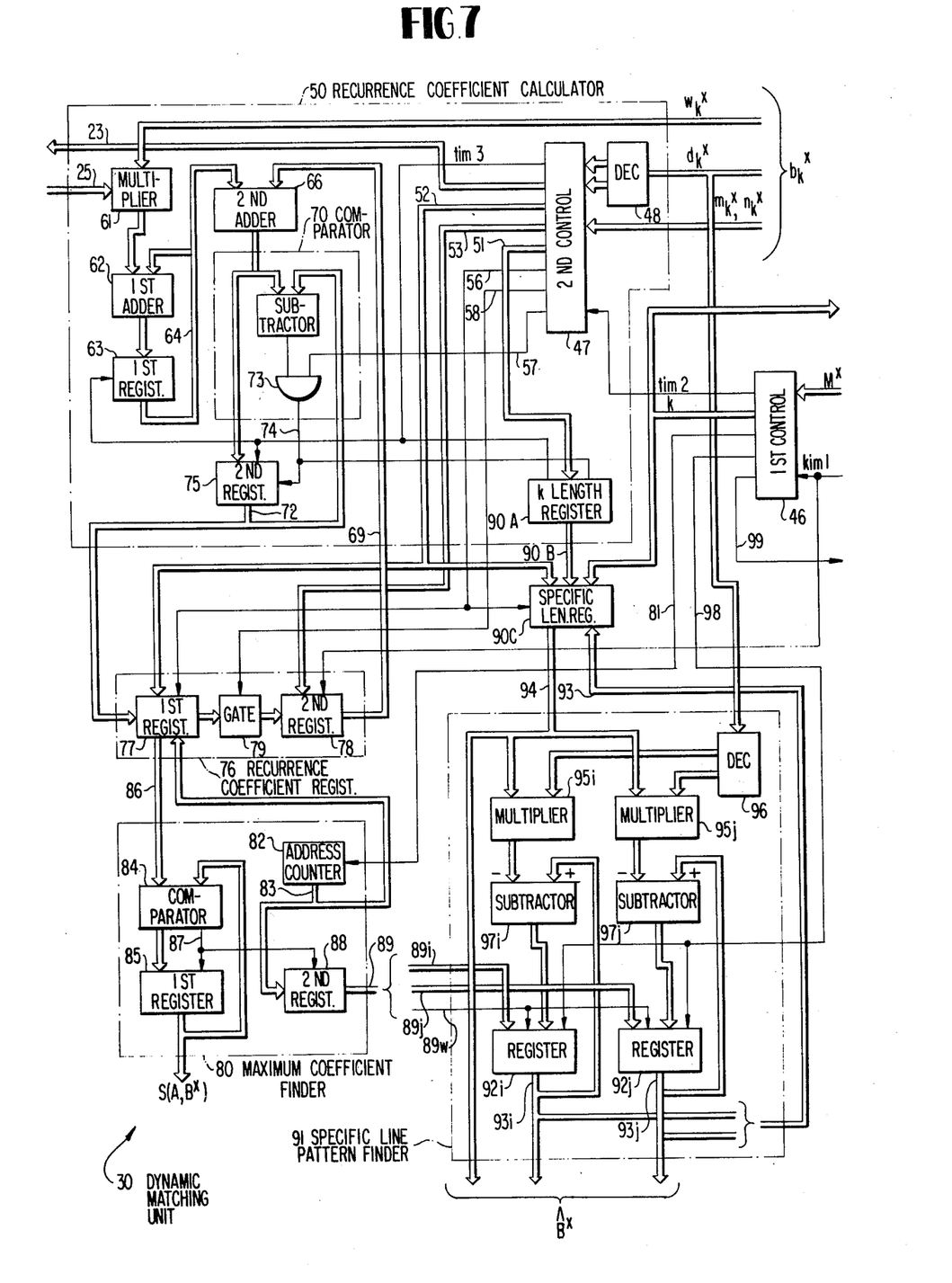
FIG. 7 is a block diagram of the dynamic matching unit.
Figure 8:
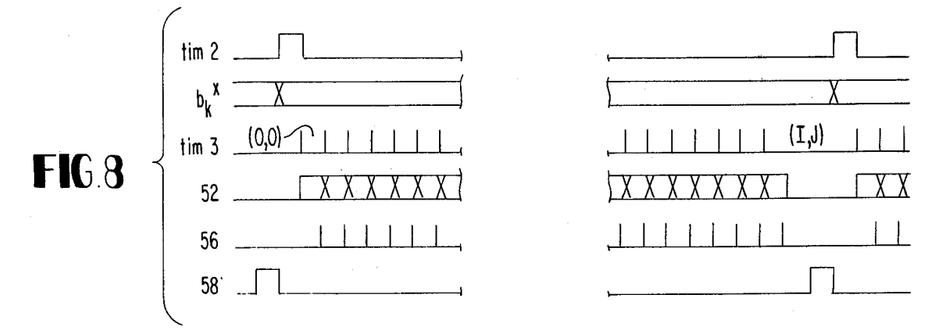
FIG. 8 shows several signals for describing operation of a recurrence coefficient calculator depicted in FIG. 7.
Figure 9:
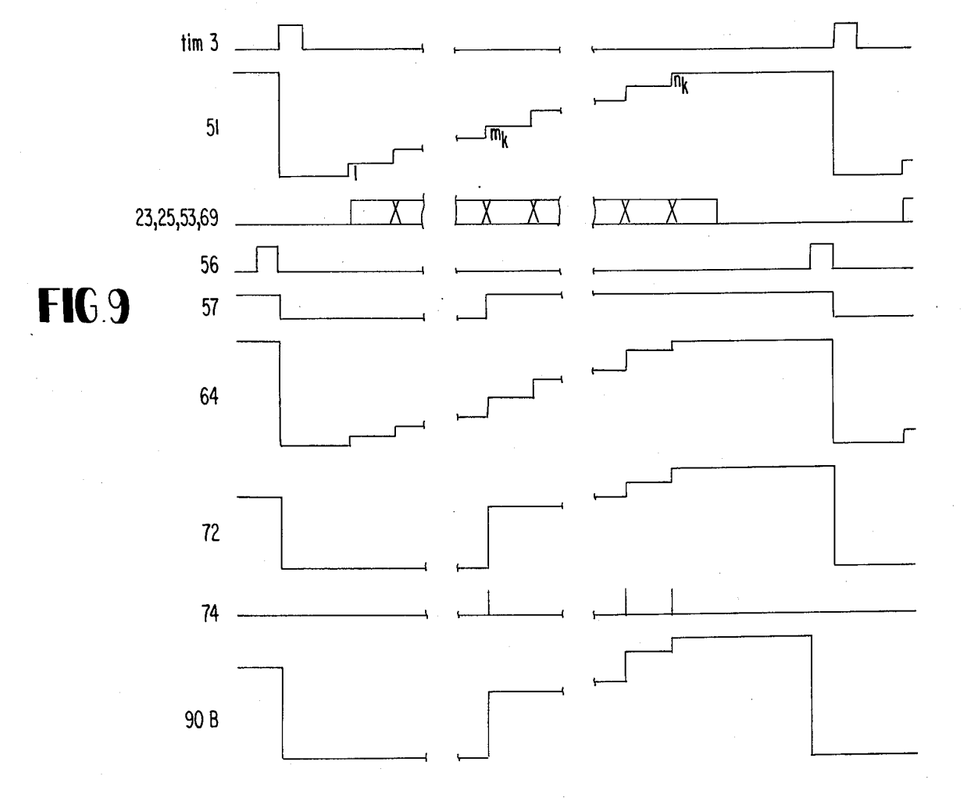
FIG. 9 shows signals for further describing operation of the recurrence coefficient calculator.

Referring again to FIGS. 4 and 5 and afresh to FIGS. 7 through 9, the dynamic matching unit 30 produces, among others, first electric signals representative of the similarity measures $S(A, B^x)$ and comprises a first control circuit 46 to which the first timing pulses tim1 and the total number signals $M^x$ are supplied. The control circuit 46 comprises counter means (not shown) responsive to the total number signal M for each of the successively specified standard patterns $B^x$ for producing the increasing vector number signals $k$ and second timing pulses tim2 (FIGS. 5 and 8) designating the vector numbers $k = 1, 2, \ldots,$ and M. the second timing pulses tim2 are supplied to a second control circuit 47 accompanied by a decoder 48 and comprised in a recurrence coefficient calculator 50 to which the standard pattern signal $b_k$ (FIGS. 5 and 8) consisting of $b_1, b_2, \ldots,$ and $b_M$ successively supplied. The decoder 48 decodes the direction bits $d_k$ into the direction signals $u_k$ and $v_k$. The second control circuit 47 comprises, in turn, timing means (not shown) responsive to each of the second timing pulses tim2 for producing third timing pulses tim3 (FIGS. 8 and 9) corresponding to the respective meshes $(i, j) = (0, 0), \ldots,$ and $(I, J)$ in the aforesaid domain during a time interval for each of the fundamental vectors $b_k$ successively designated by the increasing vector number signals $k$, and counter means (not shown) responsive to the maximum length bits $n_k$ of the designated one of the fundamental vectors $b_k$ for varying its counts from unity up to a number representative of the maximum length $n_k$ and for producing line pattern vector length signals 51 (FIG. 9) that increases from unity to the maximum length $n_k$ while one of the meshes $(i, j)$ is specified by the third timing pulses time. The circuit 47 further comprises calculator means (not shown) responsive to the third timing pulses tim3 for producing first coordinate address signals 52 (FIG. 8) specifying the meshes $(i, j)$ in Equation (4) and, responsive to the counts of the last-mentioned counter means, the direction signals $u_k$ and $v_k$, and the minimum length bits $m_k$ for producing second coordinate address signals 53 (FIG. 9) representative of meshes $(i - eu_k, j ev_k)$ of the starting points of line pattern vectors which have the direction $(u_k, v_k)$ of the fundamental vector specified by each of the vector number signals $k$, the end point at the mesh corresponding to each of the third timing pulses tim3, and lengths $e$ determined by the vector length signals 51. For instance, the first coordinate address signals 52 may increase from $j = 0$ to $j = J$ while $i$ is kept at first at 0. Subsequently, $i$ is kept at 1 and $j$ is increased from 0 to J. Repeating the processes, the address signals 52 specify the meshes $(i, j)$ in the domain previously mentioned. The coordinate address signals 23 (FIG. 9) described with reference to FIG. 4 and produced by the calculator means shall now be called third coordinate address signals, which specify meshes $(i - (e-1)u_k, j - (e-1)v_k)$ which the last-mentioned line pattern vectors, except their starting points, pass through. The second control circuit 47 further produces a first register enable pulse 56 (FIGS. 8 and 9) near the end of a time interval for each of the meshes $(i, j)$, a logic 1 first gate enable signal 57 (FIG. 9) while the counts of the last-mentioned counter means are between the minimum and maximum lengths $m_k$ and $n_k$, and a second gate enable pulse 58 (FIG. 8) at the end of a time interval for each of the vector numbers $k$.

Further referring to FIGS. 7 through 9, the input signals 25 (FIG. 9) that the input pattern buffer memory 22 successively produces during a time interval for each of the meshes $(i, j)$ in response to the third coordinate address signals 23 are multiplied at a multiplier 61 of the recurrence coefficient calculator 50 by the weight bits $w_k$ of the relevant one of the fundamental vectors $b_k$. A first adder 62 derives the sums of the products and the contents of a first register 63 preliminarily reset by the third timing pulses tim3 and produces in compliance with Equation (2) output signals 64 (FIG. 9) representative of those values of $H_k(i, j, e)$ which are for use in Equation (4) and vary within the last-mentioned time interval with the line pattern vector lengths $e$. A second adder 66 derives the sums of the register output signals 64 and previous coefficient signals 69 (FIG. 9), which are produced in the manner described hereunder and represent previous values $g_{k-1}(i - eu_k, j - ev_k)$ of the $(k-1)$-th recurrence coefficient for the meshes specified by the second coordinate address signals 62, to successively produce output signals representative of the values of the formula enclosed with the brackets in Equation (4) for the respective vector lengths $e$. A comparator 70 comprises a subtractor 71 for subtracting the second adder output signals from new coefficient signals 72 (FIG. 9) produced in the manner soon described to produce a sign bit signal each time the former is greater than the latter, and an AND gate 73 enabled by the first gate enable signal 57 and supplied with the sign bit signal. The comparator 70 delivers the second adder output signals as first output signals thereof and produces, when the second adder output signals are greater than the new coefficient signals 72, second register enable pulses 74 (FIG. 9) as its second output signals. A second register 75 is preliminarily reset by the third timing pulses tim3 and stores the first comparator output signals in response to the second register enable pulses 74. Inasmuch as the content of the register 75 is renewed each time the second adder output signal is greater than its content, the register 75 holds therein upon completion of calculation for $e = 1$ through $n_k$ the maximum value of the coefficients $9_k (i, j)$ calculated for the line pattern vectors having their ends altogether at one of the meshes $(i, j)$ that corresponds to the last-mentioned time interval. As the calculation proceeds with the third timing pulses tim3 which follow one of the vector number signals $k$ and specify the last-mentioned time interval and other similar intervals consecutive thereto, the content of the second register 75 and hence the new coefficient signals 72 become representative of the recurrence coefficient $g_k (i, j)$ of the stage of calculation designated by the last-mentioned one vector number signal.

Referring back to FIG. 5 and once more to FIGS. 7 through 9, the dynamic matching unit 30 comprises a recurrence coefficient register 76 comprising, in turn, a first register 77 and a second register 78 having addresses specifiable by the first and second coordinate address signals 52 and 53, respectively, the number of addresses of each register 77 or 78 being for $(I + 1) (J + 1)$ words. Responsive to the first register enable pulse 56 produced upon completion of calculation for each mesh $(i, j)$ of each stage of Equation (4), the first register 77 stores the new coefficient signal 72 representative of the recurrence coefficient $g_k (i, j)$ of the stage at the addresses specified by the first coordinate address signals 52. A transfer gate 79 interposed between the registers 77 and 78 is enabled by the second gate enable pulse 58 produced at the end of calculation of each stage of Equation (4) to transfer all contents of the first register 77 to the corresponding addresses of the second register 78, which is preliminarily reset by the first timing pulses tim1 for setting therein the initial condition for Equation (4) so as to enable calculation of the similarity measure S (A, B) for the specified standard pattern B. When addressed by the second coordinate address signals 53 during calculation of Equation (4) for the $k$-th stage, the second register 78 produces as the previous coefficient signals 69 those values of the $(k - 1)$-th stage recurrence coefficient which are stored in the addresses $(i - eu_k, j - ev_k)$. When the calculation is carried out up to the M-th stage, the first register 77 stores the recurrence coefficients $g_M(i, j)$ for those line patterns B' derived from the specified standard pattern B which have the ends $(i_M, j_M)$ of the M-th line pattern vectors at the meshes $(i, j)$ in the domain mentioned previously.

Figure 10:
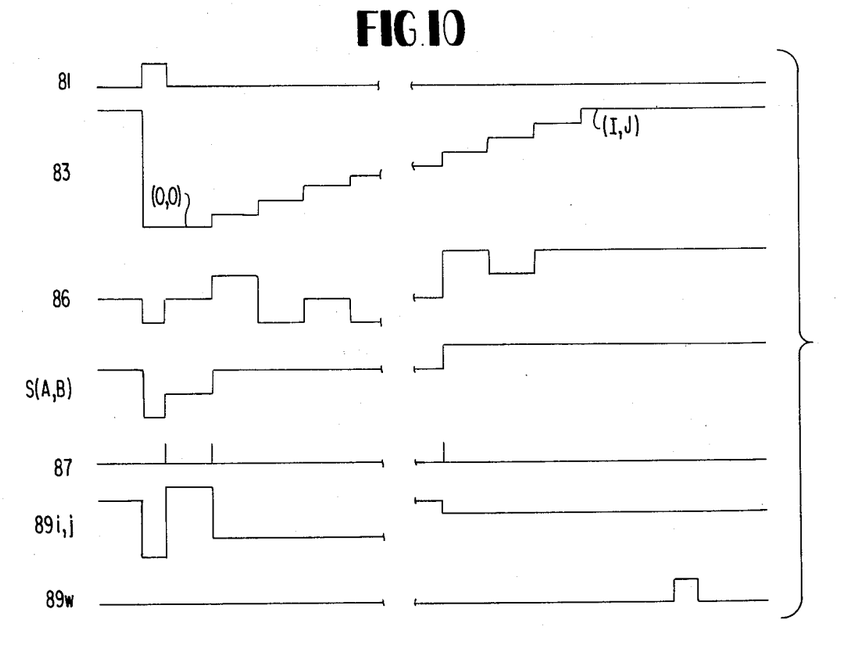
FIG. 10 shows signals for describing operation of a maximum coefficient finder illustrated in FIG. 7.

Referring still further to FIG. 7 and anew to FIG. 10, the dynamic matching unit 30 comprises a maximum recurrence coefficient finder 80 for calculating Equation (5) and for finding the maximum of the recurrence coefficients $g_M(i, j)$ with the M-th line pattern vector end $(i_M, j_M)$ moved from a mesh to another in the above-mentioned domain. It is to be noted here that the first control circuit 46 produces a start pulse 81 (FIG. 10) for the finder 80 after the vector number signals $k$ depicted in FIG. 5 reached the total number M. The finder 80 comprises an address counter 82 set into operation by the start pulse 81 to supply the recurrence coefficient register 76 with fourth coordinate address signals 83 (FIG. 10) representative of the coordinates $(i, j)$ used in Equation (5). The finder 80 further comprises that combination of a comparator 84 and a first register 85 which is supplied with signals 86 (FIG. 10) representative of the recurrence coefficients $g_M(i, j)$ from the recurrence coefficient register 76 in response to the fourth address signals 83 and operates like the combination of the comparator 70 and second register 75 of the recurrence coefficient calculator 50 to produce stepwise increasing recurrence coefficients $g_M(i, j)$ and register enable pulses 87 (FIG. 10), which in this case are the successively produced sign bit signals. The finder 80 still further comprises a second register 88 enabled by the register enable pulses 87 to produce as end point signals 89 successively registered ones of the address signals 83. When all recurrence coefficients $g_M(i,j)$ are read out of the recurrence coefficient register 76, the first and second registers 85 and 88 retain the maximum value thereof, namely, the similarity measure S(A, B) for the specified standard pattern B, and the vector end point $(\hat{i}_M, \hat{j}_M)$ of the specific line pattern $\hat{B}$, respectively. The end point signal 89 consists of $i$ and $j$ end point signals 89$i$ and 89$j$ (FIG. 10) representative of the $i$ and $j$ coordinates and a write-in pulse 89$w$ (FIG. 10) produced after the address counter 82 counted the maximum coordinates (I, J).

Referring back to FIGS. 4, 7, and 9, the dynamic matching unit 30 produces second electric signals representative of the specific line patterns $\hat{B}^x$. The recurrence coefficient calculator 50 comprises a $k$-th, more particularly, $k$-and-$(i, j)$-th, vector length register 90A which is reset by each of the third timing pulses tim3 and successively registers those of the line pattern vector length signals 51, which are produced by the second control circuit 47 at the time of production of the second register enable pulses 74, so as to hold therein and produce as its output signals 90B (FIG. 9) successively registered ones of the vector length signals 51. At the time of or before production during the last-mentioned time interval of the vector length signal 51 representative of the maximum length $n_k$, the register output signal 90B becomes representative of the vector length $e(k, i, j)$ that gives the maximum of the values of the formula enclosed with the brackets in Equation (4) during calculation thereof for one of the meshes $(i, j)$ of the domain. The matching unit 30 comprises a specific vector length register 90C supplied with the increasing vector number signals $k$ and with the first coordinate address signals 52 to register at the address $k$ and $(i, j)$ specified by the supplied signals $k$ and 52 the vector lengths $e(k, i, j)$ when the first register enable pulses 56 are produced at the ends of the respective intervals for calculation of Equation (4) for the meshes $(i,j)$ and for the vector numbers $k$. Although not yet known, one of the registered vector lengths e $(k, i, j)$ is the specified vector length $\hat{e}(k, i, j)$.

Figure 11:
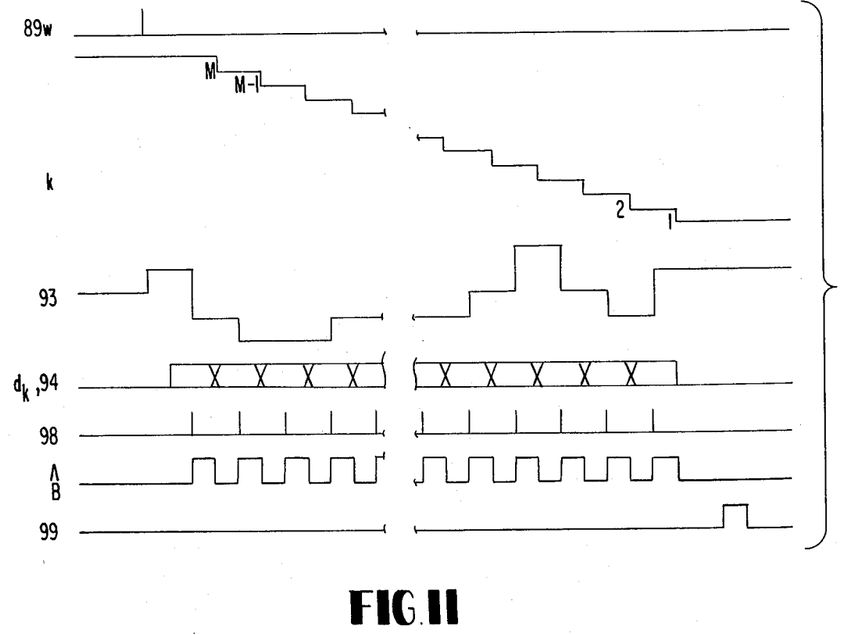
FIG. 11 shows signals for describing operation of a specific line pattern finder illustrated in FIG. 7.

Referring again to FIGS. 4 and 7 and afresh to FIG. 11, the dynamic matching unit 30 comprises a specific line pattern finder 91 calculating Equation (6) and comprising in turn $i$ and $j$ registers 92$i$ and 92$j$ into which the $i$ and $j$ end point signals 89$i$ and 89$j$ are written at first by the write-in pulse 89$w$. The registers 92$i$ and 92$j$ produce specific vector end point signals 93$i$ and 93$j$ (FIG. 11) which vary from the M-th vector end point $(\hat{i}_M, \hat{j}_M)$ of the specific line pattern B as will soon become clear and serve in combination as fifth coordinate address signals 93. The specific vector length register 90C is addressed by cooperation of the vector number signals $k$, now decreasing from M to unity as shown in FIG. 11, and the fifth address signals 93 to supply specific vector length signals 94 (FIG. 11) to $i$ and $j$ multipliers 95$i$ and 95$j$. Responsive to the decreasing vector number signals $k$, the standard pattern memory 29 supplies the direction bits $d_k$ to a decoder 96 which delivers the direction signals $u_k$ and $v_k$ to the respective multipliers 95$i$ and 95$j$. At first, the M-th specific vector length $\hat{e}_M$, namely, $\hat{e}(M, i_M, j_M)$ is multiplied by the M-th standard vector direction ($u_M, v_M$). At this time, $i$ and $j$ subtractors 97$i$ and 97$j$ are supplied with the M-th specific vector end point ($\hat{i}_M, \hat{j}_M$) from the registers 92$i$ and 92$j$. Therefore, signals $\hat{i}_M - \hat{e}_M u_M$ and $\hat{j}_M - \hat{e}_M v_M$, namely, the $(M-1)$-th specific vector end point ($\hat{i}_{M-1}, \hat{j}_{M-1}$), and other specific vector end points are written into the registers 92$i$ and 92$j$ by write-in pulses 98 (FIG. 11) produced by the first control circuit 46. The vector length signals 94 are successively produced without change by the finder 91 as the vector length signals $\hat{e}_k$ of the specific line pattern $\hat{B}$. The first control circuit 46 now produces an end signal 99 representative of completion of calculation of the similarity measure $S(A, B)$ and the specific line pattern $\hat{B}$ for the specified standard pattern $B$.

Figure 12:
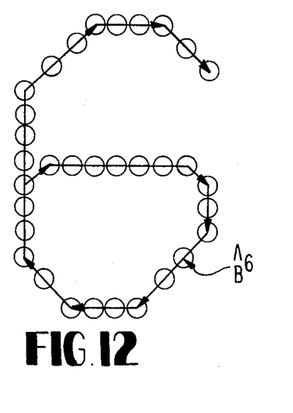
Figure 13:
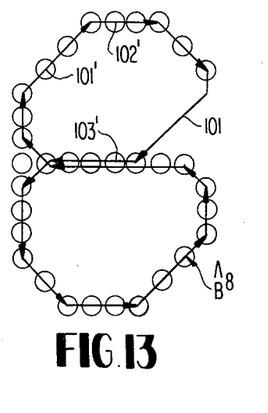

Referring now to FIGS. 12 through 15, it is to be pointed out that a similarity measure $S(A, B^y)$ for a wrong standard pattern $B^y$ could be greater than that $S(A, B^z)$ for a correct standard pattern $B^z$ under certain circumstances. For example, let it be presumed that an input pattern A be a numeral 6 and that the similarity measure $S(A, B^8)$ be greater than the similarity measure $S(A, B^6)$. It is, however, clear from FIGS. 12 and 13 that a specific line pattern $\hat{B}^8$ has a vector 101 which a specific line pattern $\hat{B}^6$ has not. Likewise, let an input pattern A be a numeral 1. It is possible with reference to FIGS. 14 and 15 to correctly recognize the input pattern 1 by the fact that the meshes between vectors 102 and 103 of a specific line pattern $\hat{B}^7$ are all dark in the present event. In some cases it is necessary to discriminate 6 from 8 by the fact that meshes interposed between line pattern vectors 101 and 101' and between 102' and 103' shown in FIG. 13 are all dark.

Figure 14:
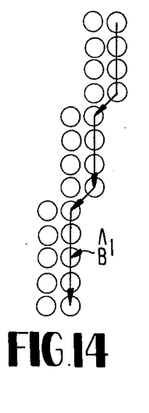
Figure 15:
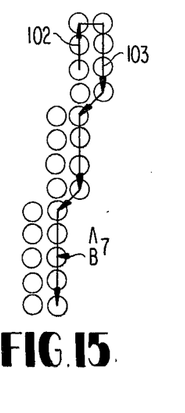
Figure 16:
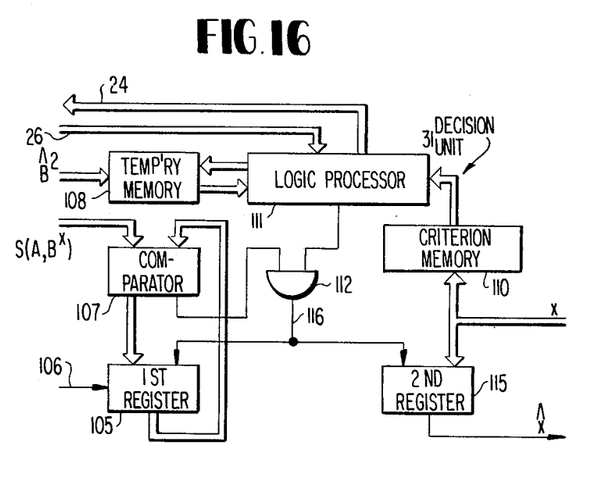
FIG. 16 is a block diagram of a decision unit depicted in FIG. 4.
Figure 17:
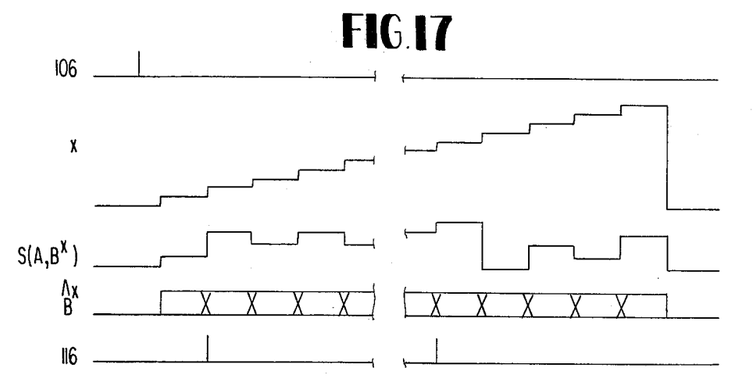
FIG. 17 shows several signals for describing operation of the decision unit.

Finally referring back to FIG. 4 and newly to FIGS. 16 and 17, the decision unit 31 comprises a first register 105 which is reset by a reset pulse 106 produced by the control unit 32 when the input signals $a(i,j)$ are put into the input pattern buffer memory 22. Supplied with the standard pattern sort signals $x$, the dynamic matching unit 30 successively delivers the first and second electric signals $S(A, B^x)$ and $\hat{B}^x$ to a comparator 107 and a temporary memory 108, respectively. A criterion memory 110 semipermanently stores criteria for the respective sorts of standard patterns $B^x$. The criteria for the numeral 6 may be the ordinal number $k$ of a fundamental vector from which the specific line pattern vector 101 mentioned in conjunction with FIGS. 12 and 13 is derivable and the fact that the specific line patterns $\hat{B}^6$ have no vectors which correspond to the vector 101. Those for the numerals 1 and 7 may be the ordinal numbers of fundamental vectors from which the specific line pattern vectors 102 and 103 described with reference to FIGS. 14 and 15 are derivable and whether dark and white meshes are interposed between these vectors 102 and 103. The criterion memory 110 supplies in response to the sort signal $x$ the relevant criteria to a logic processor 111 which may be processor described by Gerald Lapidus in *IEEE Spectrum*, Volume 9, No. 11 (November, 1972), pp. 33–40, particularly with reference to FIGS. 1 through 3 thereof. Responsive to the ordinal number or numbers contained in the supplied criteria, the logic processor 111 supplies address signals to the temporary memory 108, receives from the latter the relevant specific line pattern vector or vectors, calculates the coordinates $(i, j)$ of meshes concerned with the specific line pattern vector or vectors, and supplies the calculated coordinates as the coordinate address signals 24 to the input pattern buffer memory 22 to read out as the input signals 26 the optical characteristics $a(i, j)$. The input signals 26 should represent dark meshes for an input pattern 1 and white meshes for an input pattern 6 or 7. When the input pattern A satisfies the criteria, the logic processor 111 supplies an enable signal to an AND gate 112. On the other hand, the comparator 107 and the first register 105 of the structure of the comparator 84 and register 86 of the maximum coefficient finder 80 compare the successively supplied similarity measures $S(A, B^x)$ with the contents of the register 105 to renew the contents and deliver a pulse to the AND gate 112 each time the former is greater than the latter. A second register 115 stores those of the standard pattern sort signals $x$ which are produced in coincidence with pulses 116 produced by the AND gate 112. As a result, the second register 115 holds the ultimate sort signal $x$ and delivers the same to the utilization device 33 upon completion of comparison of the input pattern A with all standard patterns $B^x$.

While this invention has thus far been described in connection with a preferred embodiment thereof together with explicit and implicit description of modifications thereof, it should be clearly understood that this invention may be put into practice in various manners. For example, the input pattern A may be light while the background is dark. It is, however, necessary in this case to make the comparators 70, 84, and 107 produce the output signals when the inequalities mentioned in connection therewith are reversed so that the symbols "min" may be substituted for "max" in Equation (4), (5), and the like. If higher-speed operation is necessary, narrow domains:

$$\left. \begin{array}{l} i_{1k} \leqq i_k \leqq i_{2k} \\ j_{1k} \leqq j_k \leqq j_{2k} \end{array} \right\}$$

may be preliminarily selected for calculation of Equation (4) for the end points ($I_k, j_k$) of the line pattern vectors $b_k$. This is done by substituting new stanard pattern vector signals $b_k(w_k, d_k, m_k, n_k, i_{1k}, i_{2k}, j_{1k}, j_{2k})$ for the corresponding signals mentioned above and by making the calculator means of the second control circuit 47 produce first coordinate address signals 52 which vary within the narrow domains for the respective vector number $k$. Incidentally, it is obvious that a device according to this invention can recognize a plurality of successive input patterns of the kind described either one after another or in groups of several input patterns.

What is claimed is:

1. A device for automatically recognizing an input pattern of one of a predetermined number of sorts by comparing said input pattern successively with standard patterns of at least said predetermined number of sorts, said input pattern being specifiable by two-dimensional array of meshes of different optical characteristics, each of said standard patterns being given by a series of fundamental vectors, which comprises:

an input pattern buffer memory means for memorizing input electric signals representative of said optical characteristics;

a standard pattern memory means for memorizing standard electric signals representative of the directions and predetermined minima and maxima of magnitudes of vectors of the standard patterns;

a dynamic matching means responsive to said input and standard electric signals for finding an extremum of degrees of coincidence between said input pattern and a plurality of line patterns derived from each of said standard patterns by varying the magnitudes between the predetermined minima and maxima to produce first electric signals representative of similarity measures defined by the extremum degrees of coincidence between said input pattern and the line patterns derived from the respective standard patterns and second electric signals representative of specific line patterns for which said extremum degrees of coincidence are found; and a decision means comprising, in turn, first means for memorizing feature electric signals representative of a predetermined feature common to the line patterns derivable from each of said standard patterns, second means for comparing said first signals with one another, third means responsive to said input, second, and feature electric signals for judging whether or not said input pattern has said predetermined feature, and fourth means responsive to results of the comparison and judgement carried out by said second and third means for producing an output electric signal representative of a result of recognition of said input pattern.

2. A device for automatically recognizing an input pattern as recited in claim 1 wherein said dynamic matching means comprises:

a recurrence coefficient calculator means connected to said input pattern buffer memory means and to said standard pattern memory means for calculating recurrence coefficients of input pattern and standard pattern vectors represented by said input and standard electric signals, respectively, a recurrence coefficient register means connected to said recurrence coefficient calculator means for accumulating and storing said recurrence coefficients, and a maximum coefficient finder means connected to said recurrence coefficient register means for calculating said similarity measures defined by the maximum degrees of coincidence between said input pattern and the line patterns derived from the respective standard patterns, said maximum coefficient finder means generating said first electric signals supplied to said decision means.

3. A device for automatically recognizing an input pattern as recited in claim 2 wherein said dynamic matching means further comprises:

a specific vector length register means connected to said recurrence coefficientt calculator means for storing signals representing specific vector lengths, and a specific line pattern finder means connected to said specific vector length register means and to said maximum coefficient finder means for calculating specific vector end points, said specific line pattern finder means generating said second electric signals supplied to said decision means.

4. A device as claimed in claim 1, said input pattern buffer memory having memory locations corresponding to the respective meshes, said standard pattern memory comprising means responsive to standard pattern sort electric signals successively designating the respective standard patterns for producing said standard electric signals, wherein said dynamic matching unit comprises:

means responsive to each of said sort signals for successively producing vector number signals representative of ordinal numbers of the fundamental vectors in the series of the standard pattern designated by said each sort signal;

means responsive to each of said vector number signals for the last-mentioned standard pattern for successively producing mesh address signals specifying the respective meshes;

means responsive to the standard electric signals for the last-mentioned standard pattern and each of said mesh address signals for successively producing line pattern vector address signals representative of the meshes for line pattern vectors which are derived from the fundamental vector of the ordinal number represented by said each vector number signal by varying the magnitude of the last-mentioned fundamental vector between the relevant minimum and maximum with ends of said line pattern vectors placed in common at the mesh specified by said each mesh address signal, said input pattern buffer memory producing in response to said line pattern vector address signals the input electric signals stored in the memory locations corresponding to said line pattern vectors;

means responsive to the last-mentioned standard electric signals and said each mesh address signal for successively producing line vector end address signals representative of the meshes for ends of the line pattern vectors which are derived in response to the vector number signal produced next prior to said each vector number signal;

first register means having memory cells corresponding to the respective meshes for storing in response to said each vector number signal third electric signals representative of recurrence coefficients dependent on the vector number represented by said each vector number signal and on said meshes at the memory cells specified by said mesh address signals and for producing in response to said vector end address signals the third electric signals which are stored in the respective memory cells specified by the mesh address signals in response to the vector number signal produced next prior to said each vector number signal;

calculator means responsive to the input electric signals produced in response to said line pattern vector address signals and responsive to the third electric signals produced by said first register means for producing the third electric signals to be stored in said first register means, said first register means eventually storing those degrees of coincidence between said input pattern and the last-mentioned standard pattern when the vector number signal represents the number of the fundamental vectors in the last-mentioned standard pattern which are given by the respective third electric signals stored in said memory cells in response to the last-mentioned vector number signal;

second register means responsive to said vector number signals for the last-mentioned standard pattern and to said mesh address signals for storing fourth electric signals, each representative of the magnitude of the the line pattern vector represented by the line pattern vector address signals in response to which the last-mentioned third electric signals are produced and representative of the mesh for the end of the last-mentioned line pattern vector; means for finding the extremum of said degrees of coincidence to produce fifth electric signals when the last-mentioned extremum is found and to produce said first electric signals as said sort signals successively designate said standard patterns; and means responsive to said fourth and fifth electric signals and the last-mentioned standard electric signals for producing said second electric signals as said sort signals successively designate said standard patterns.

5. A device as claimed in claim 1 wherein said first means comprises means responsive to each of standard pattern sort electric signals designating the respective standard patterns for producing first feature signals representative of an ordinal number of a predetermined fundamental vector in the series of one of said standard patterns that is designated by said each sort electric signal, said predetermined fundamental vector relating to the predetermined feature of said one standard pattern, and means responsive to said each sort electric signal for producing second feature signals defining the last-mentioned predetermined feature, said first and second feature signals serving as said feature electric signals.

6. A device as claimed in claim 5 wherein said third means comprises a specific line pattern memory responsive to the second electric signals representative of the specific line pattern derived from and one standard pattern for memorizing electric signals representative of optical characteristics predetermined for those specific line pattern vectors of the last-mentioned specific line pattern which are derived from the respective fundamental vectors of said one standard pattern, and a processor responsive to said first feature signals for making said specific line pattern memory produce the specific electric signals representative of the predetermined optical characteristics of the specific line pattern vector of said ordinal number, producing specific coordinate address signals for making said input pattern memory produce the input electric signals representative of the different optical characteristics of a line pattern vector corresponding in said input pattern to the last-mentioned specified line pattern vector, for comparing said specific and the last-mentioned input electric signals to judge with reference to said second feature signals whether or not said input pattern has said predetermined feature, and for producing in response to the result of the judgement a gate enable signal in the affirmative case.

7. A device as claimed in claim 6, said standard pattern memory comprising means responsive to said sort signals for producing the standard electric signals representative of the standard patterns successively designated by said sort signals, wherein said second means produces an output pulse each time the first electric signals representative of the similarity measure for one of said standard patterns are greater than the first electric signals representative of the similarity measures for the standard patterns designated prior to the last-mentioned one standard pattern, said output pulse being representative of said result of the comparison.

8. A device as claimed in claim 7 wherein said fourth means comprises an AND gate enabled by said enable signal for gating the output pulses and a register for registering the sort signals in coincidence with the output pulses gated through said AND gate to eventually register and produce said output electric signal.

* * * * *